United States Patent
Breiland et al.

(10) Patent No.: US 7,197,446 B2
(45) Date of Patent: Mar. 27, 2007

(54) HIERARCHICAL METHOD OF POWER SUPPLY NOISE AND SIGNAL INTEGRITY ANALYSIS

(75) Inventors: Erik Breiland, Colchester, VT (US); Timothy W. Budell, Milton, VT (US); Charles S. Chiu, Essex Junction, VT (US); Paul L. Clouser, Williston, VT (US); Charles K. Erdelyi, Essex Junction, VT (US); Brian P. Welch, Scotia, NY (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 10/711,168

(22) Filed: Aug. 30, 2004

(65) Prior Publication Data

US 2006/0047490 A1    Mar. 2, 2006

(51) Int. Cl.
    *G06F 17/50*   (2006.01)
(52) U.S. Cl. ............... 703/14; 703/2; 716/1; 716/4; 716/10
(58) Field of Classification Search ............ 703/2, 703/14; 716/1, 4, 10
    See application file for complete search history.

(56) References Cited

U.S. PATENT DOCUMENTS 6,584,596 B2 *   6/2003   Buffet et al. .............. 716/1

2003/0061571 A1 *   3/2003   Buffet et al. .............. 716/1

OTHER PUBLICATIONS

Shumakher et al., E. On the Noise Properties of Injection-Locked Oscillators, IEEE Transactions on Microwave Theory and Techniques, vol. 52, No. 5, May 2004, pp. 1523-1537.*
Rosenbaum et al., E. Silicon Dioxide Breakdown Lifetime Enhancement Under Bipolar Bias Conditions, IEEE Transaction on Electron Devices, vol. 40 No. 12, Dec. 1993, pp. 2287-2295.*
Kust et al., E. Influence of Solvent Nature on the Elctrochemical Parameters of Electrical Double Layer Capacitors, Journal of Electroanalytical Chemistry, vol. 562, No. 1, Jan. 2004, pp. 33-42.*
Van Heijningen et al., High-Level Simulation of Substrate Noise Generation including Power Supply Noise Coupling, Proceedings of the 37th Conference on Design Automation, Jun. 2000, ACM Press, pp. 446-451.*

* cited by examiner

*Primary Examiner*—Russell Frejd
(74) *Attorney, Agent, or Firm*—Schmeiser, Olsen & Watts; Anthony J. Canale

(57) ABSTRACT

The invention relates generally to a method of power supply noise and signal integrity analysis for creating frequency-dependent electrical models particularly related to microelectronic packages. The method discloses creation of equivalent circuits for geometries encountered in a typical chip package, including how to partition the geometry into cells which are less then 1/20 the minimum wavelength (λ) in size, and how to handle signal and power supply vias, signal wires, and power planes. The method also instructs how to assign values to each of the inductors, capacitors, resistors, and transmission lines in each equivalent circuit. The method further provides modeling of only those interactions which occur between adjacent cells.

30 Claims, 15 Drawing Sheets

(Flow Chart) 1400

Cell Dimensions

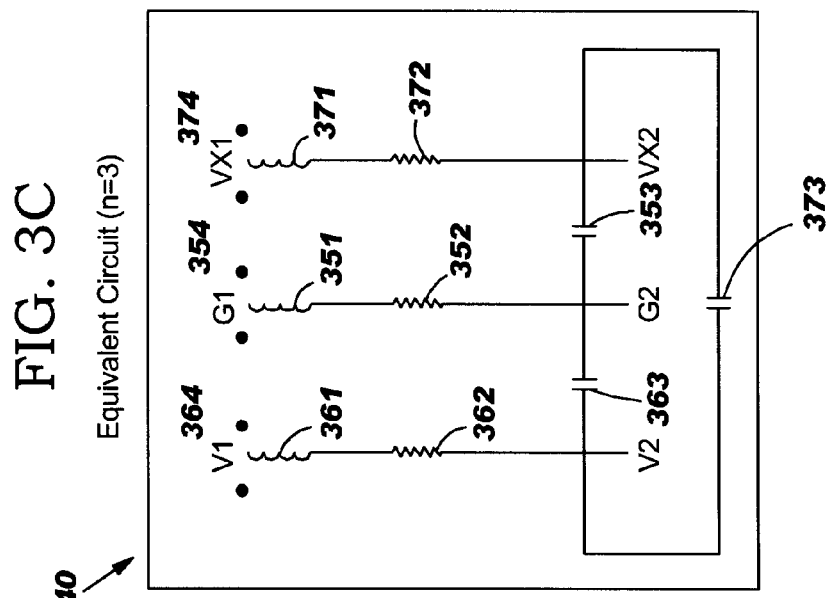
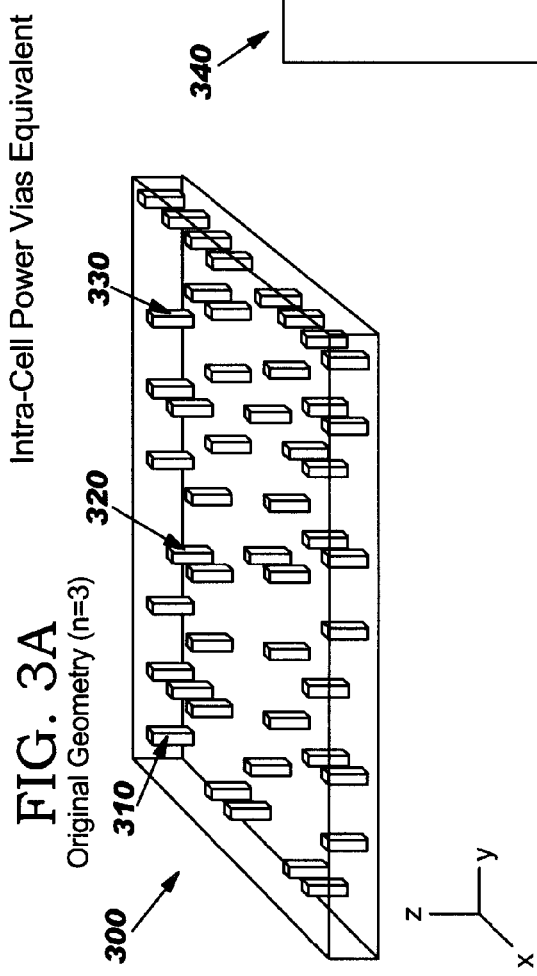
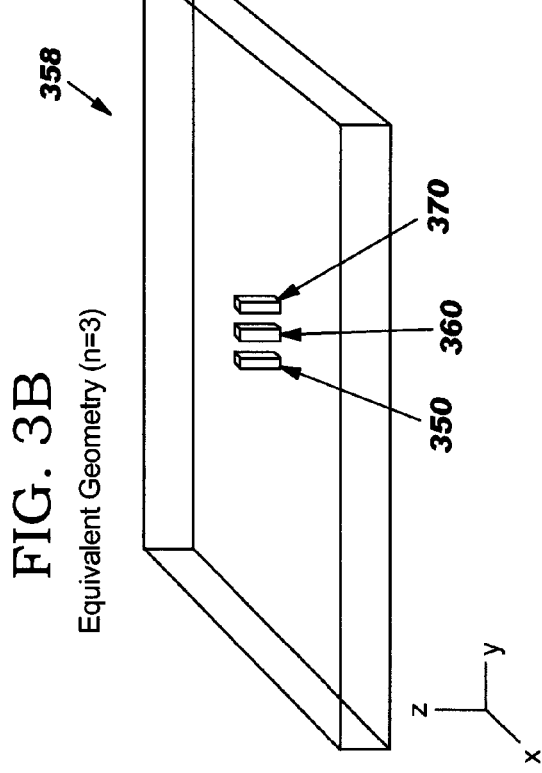

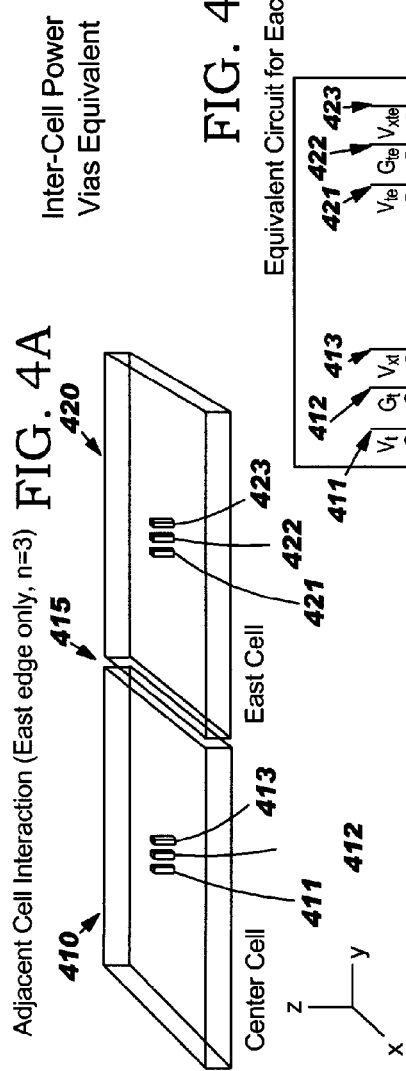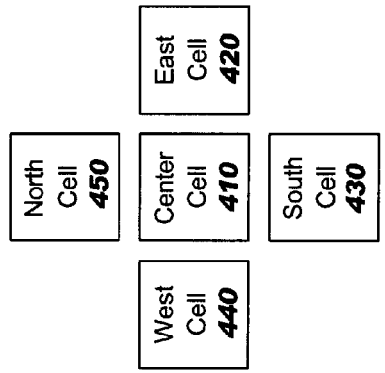

Intra- and Inter-Cell Power Plane Equivalent
Adjacent Cell Interaction (East edge only, n=3)

Equivalent Circuit for Each Edge (n=2)

Transmission-line equivalent of power-plane cell $$Z_0 = \sqrt{\frac{2L_{plate}}{C_{plate}}} \qquad t_d = \sqrt{\frac{L_{plate}C_{plate}}{2}} = \tau/\sqrt{2}$$

$$L_{plate} = 5\mu/t$$

Two RLC equivalents of power-plane cell

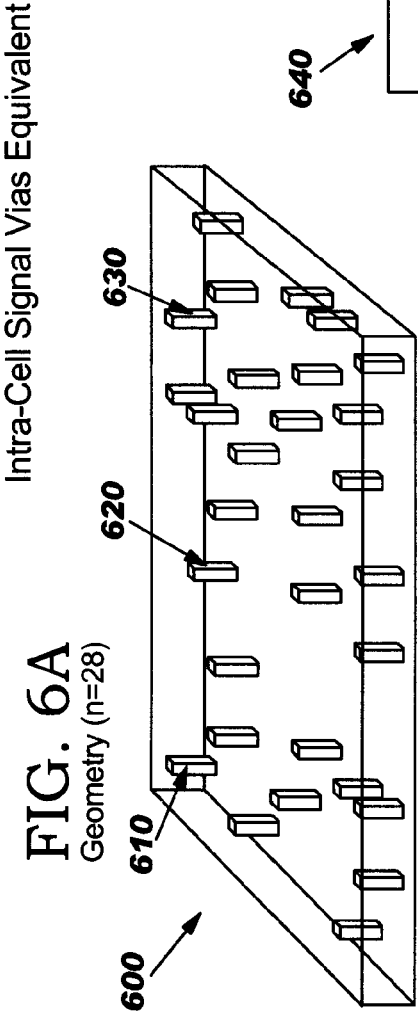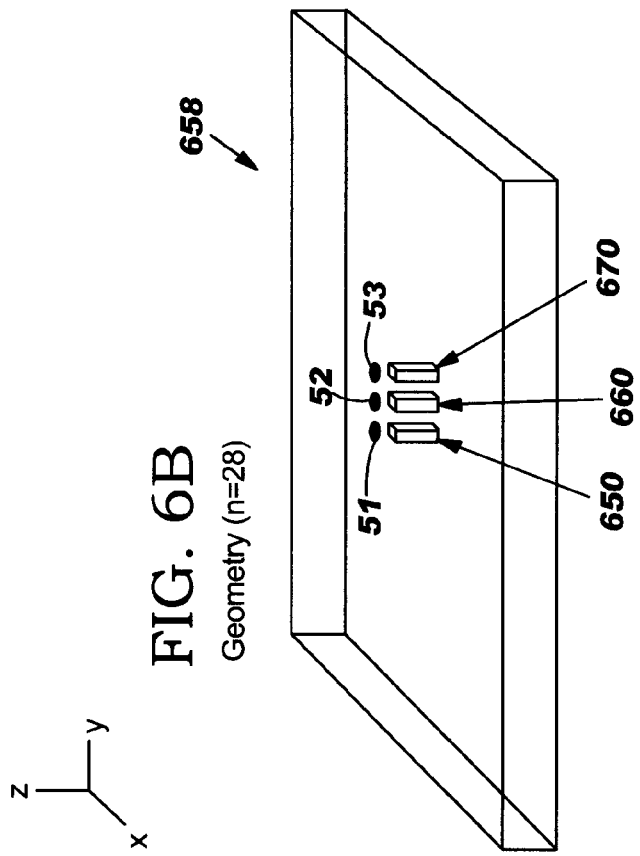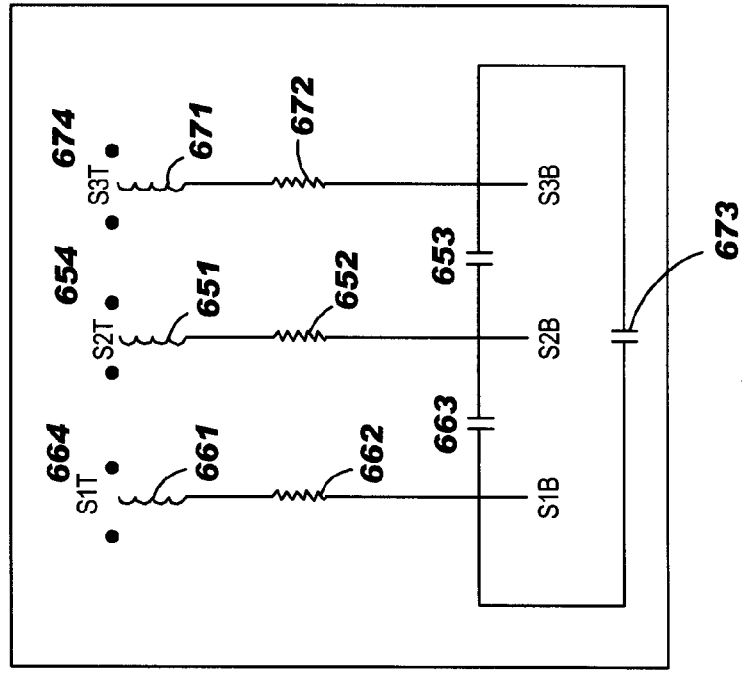

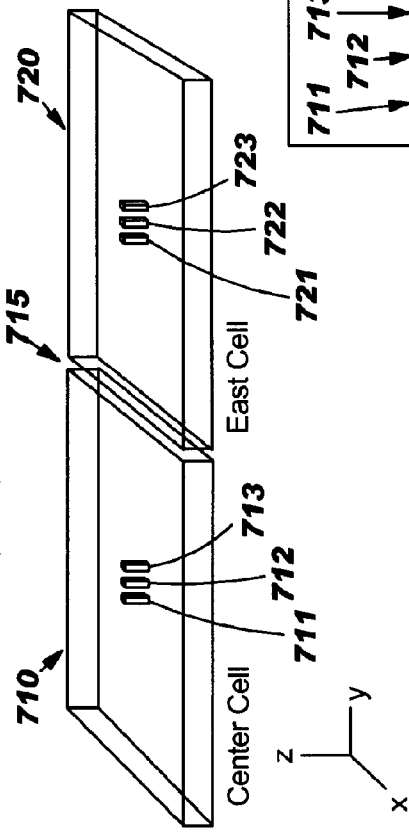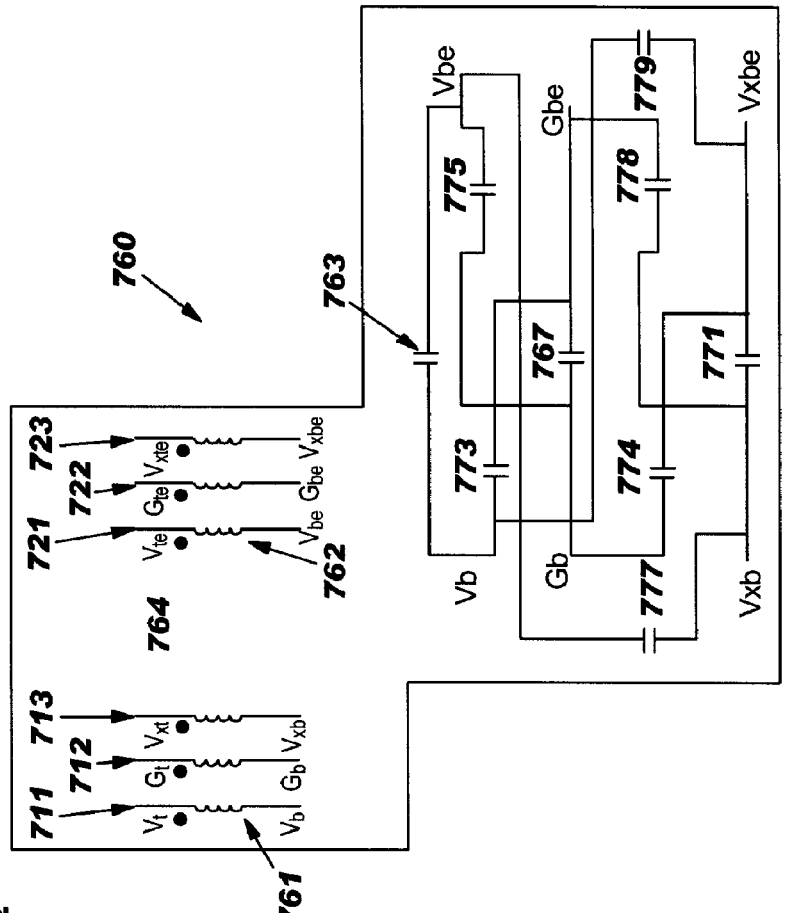
FIG. 7A Adjacent Cell Interaction, Equivalent Geometry (East edge only, n=3, m=3)
FIG. 7B Equivalent Circuit at Adjacent Edge (n=3, m=3)
Inter-Cell Signal Vias Equivalent

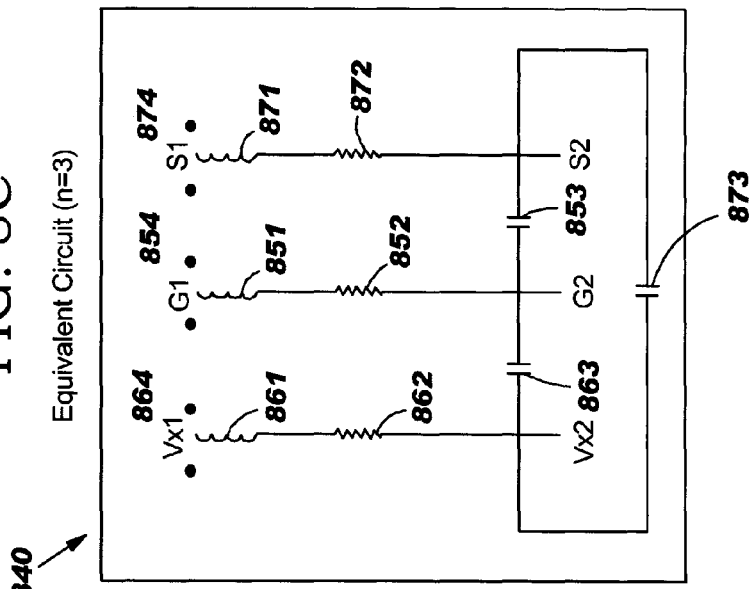
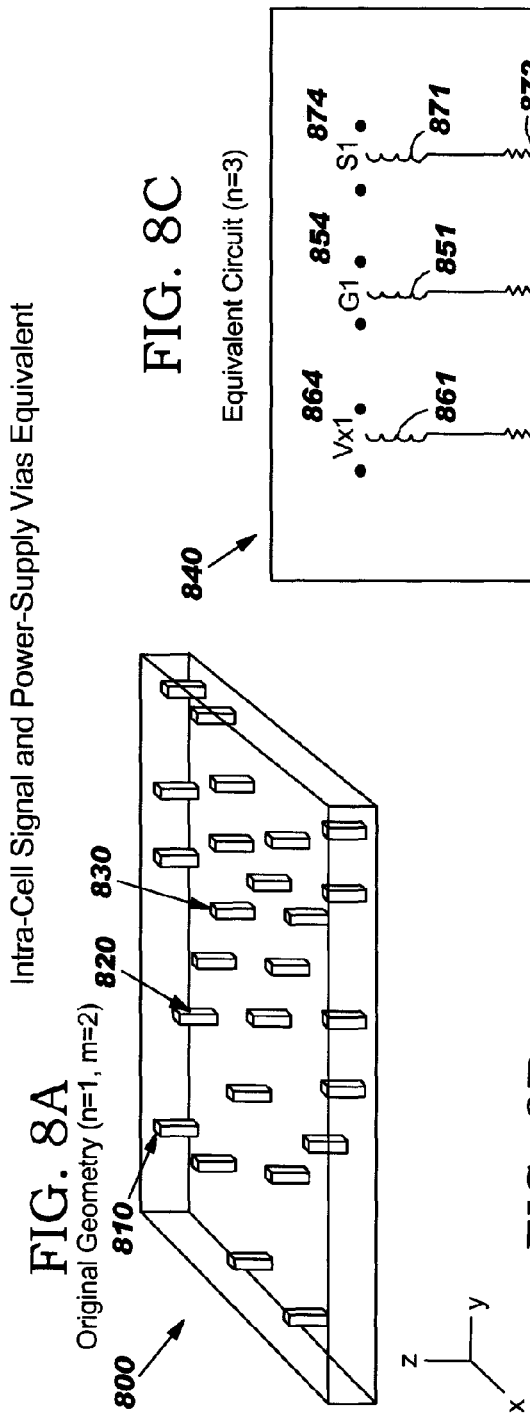
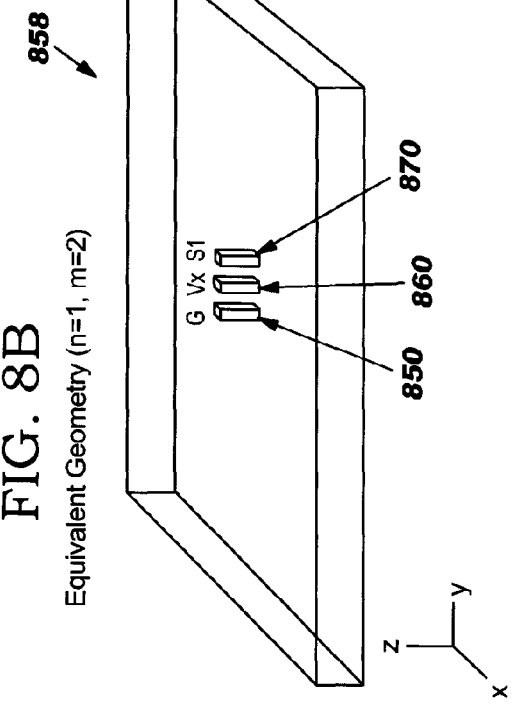

Adjacent Cell Interaction, Equivalent Geometry (East edge only, n=3, m=3)

Inter-Cell Signal and Power-Supply Vias Equivalent

Equivalent Circuit (n=1, m=2)

Geometry (n=2, m=2)

Intra-Cell Signal Wires to Power-Plane Equivalent

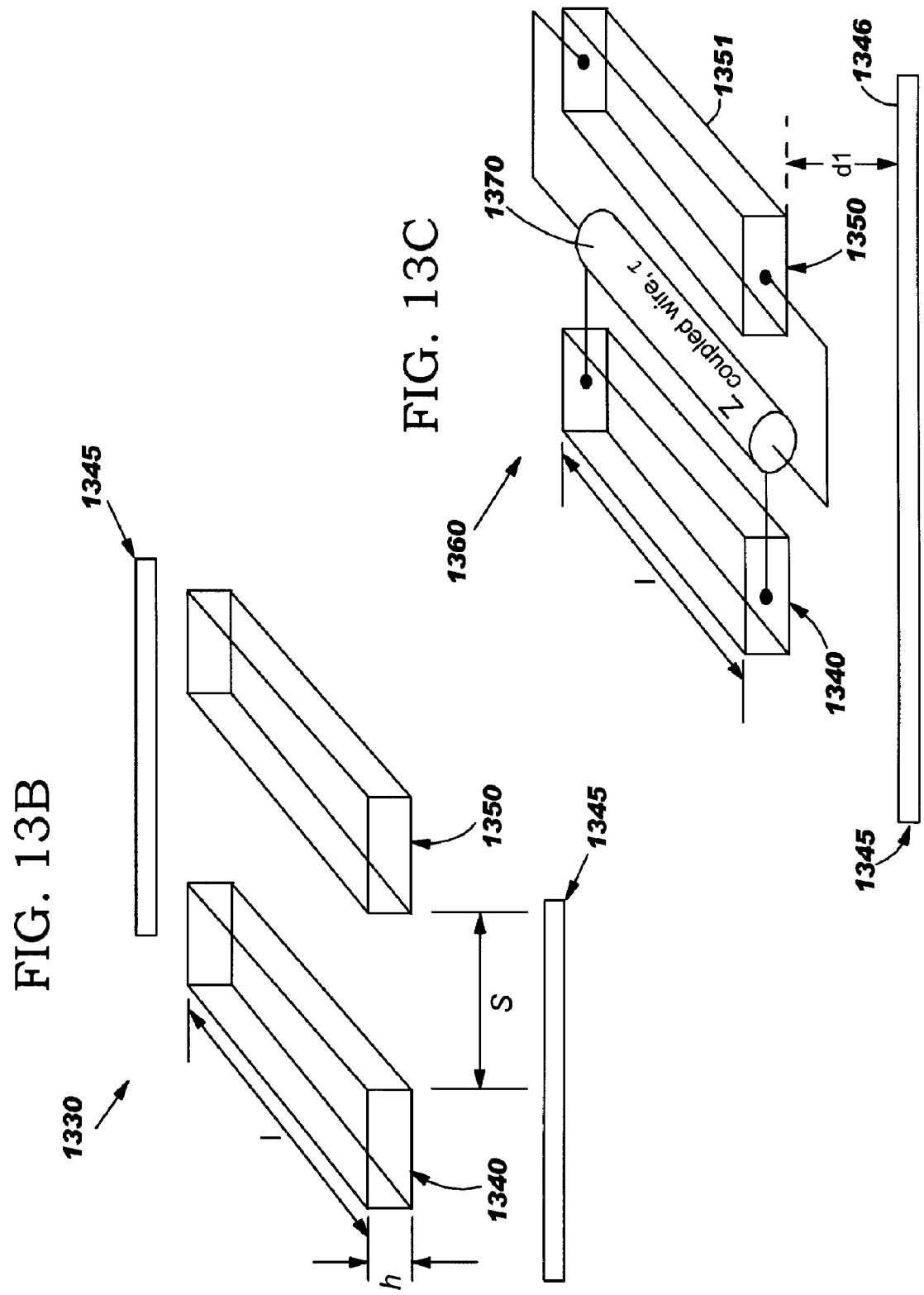

HIERARCHICAL METHOD OF POWER SUPPLY NOISE AND SIGNAL INTEGRITY ANALYSIS

BACKGROUND OF INVENTION

1. Technical Field

The invention relates generally to a method of power supply noise and signal integrity analysis for creating frequency-dependent electrical models, and is particularly related to power supply and signal integrity analysis of microelectronic package structures.

2. Related Art

A long-standing problem in the design of semiconductor integrated circuit chip systems has been the proper assessment of signal integrity, coupling, power supply noise, and resonances such as LC resonance, and package cavity resonance. Accurately modeling these electrical phenomena is made difficult by the large number of system components—typically at least thousands of vias, hundreds of signal wires, multiple power supplies, and complicated power-plane structures. As used throughout this specification, the term "vias" is intended to denote vertical, electrically conductive connections between different electrically conductive planes or signal lines, where these vertical connections are perpendicular to the planes and the signal lines. The problem is compounded at higher frequencies (i.e., frequency ranges above approximately 1 GHz), where the electromagnetic flight time across the system is longer than the switching time of the signals. Transmission line effects become dominant, and any accurate model must take the propagation delays through the structure into account.

In the past, a popular technique for modeling system components has been to calculate their electrical interaction as if there were no time delay between them. This so-called "lumped element" approach works at low frequencies (e.g., up to about 100 MHz), but yields results that are significantly erroneous at the higher frequencies commonly used today. With this lumped element technique, all components are assumed to interact with all other components. A network of inductors (L), resistors (R), and capacitors (C), is used to create a circuit model which represents the electrical interactions of the system's components. This RLC network is then simulated with a circuit-solver program such as SPICE. This technique creates an electrical representation of a microelectronic package, chip, or board in a readily portable and simulatable, industry-standard format. However, errors arise with this technique when the rise time of the signals is faster than the interaction of the system's components, which is limited by the speed of light in the medium.

Another characteristic of common simulation methodologies is that these full-wave electromagnetic simulation methods use the entire geometry of the system in an attempt to model all the wires simultaneously. Such simulation models, whether two-dimensional or three-dimensional, attempt to simulate conditions wherein each wire couples to every other wire. Given a number of signal wires equal to N, the resultant simulation produces an (N×N) matrix, which in turn produces an N-squared computational problem. As N becomes large, the computations become prohibitively slow.

Thus, a need exists for a method of creating, from the component geometries of a system in a manner that takes into account the switching time of the signals and the time delay between the components, circuit models that will run efficiently on familiar circuit simulators, and which overcome the deficiencies of the related art.

SUMMARY OF INVENTION

To overcome the above deficiencies, the present invention provides a method, embodied in a computer program, of dividing the microelectronic package structure into a hierarchy of smaller cubes or cells, referred to herein as "cells". The size of each cell may be determined from the fastest signal rise time in the medium, or, alternatively, as a fraction of the wavelength ($\lambda$) of the signal knee frequency (e.g., $\lambda/20$). Electrical interaction within and between these smaller structures are then modeled using lumped element or field effect (i.e., transmission line) coupling techniques to model the entire system under investigation. The method creates familiar circuit models from the component geometries of a system in a manner that takes into account the switching times of the signals and the time delays between the components. The method of the present invention also reduces the number of elements in the model to improve its computational efficiency while retaining the capability of accurately simulating high-speed electromagnetic effects such as transmission line reflections, planar resonances, and power supply oscillations.

In a first general aspect, the present invention provides a method of power supply noise and signal integrity analysis for creating frequency-dependent electrical models related to microelectronic packages, said method comprising: extracting geometries from a microelectronic package; partitioning said geometries into a plurality of cells, said shapes having a characteristic size in each dimension, wherein said characteristic size is derived from the fastest signal rise time in the medium of said microelectronic package; creating a plurality of equivalent electrical circuits for said geometries; determining an equivalent circuit for each of said cells; determining an equivalent circuit for the electromagnetic signal coupling between equivalent circuits; and outputting said equivalent circuits configured for use in an electrical circuit simulator.

In a second general aspect, the present invention provides a method of power supply noise and signal integrity analysis of the electrical interactions between functional components of an electrical system, said electrical system formed in a medium, said method comprising: categorizing said functional components into at least one functional category; extracting geometries from said electrical system based on said functional category; dividing said electrical system into a plurality of cells, wherein each cell has at least one directly neighboring cell, wherein each cell has a length and a width dimension, said length and width dimension generally being equal to the maximum length and width defined by a fraction of the wavelength corresponding to the knee frequency; determining whether functional components are present within given ones of said cells; modeling electrical interactions between functional components within said given cells; determining which functional components are located in directly neighboring cells; modeling electrical interactions between functional components located in directly neighboring cells; calculating equivalent circuits related to the electrical interactions between said functional components within said cells and between directly neighboring cells; and outputting said equivalent circuits in a format usable by an electrical circuit simulator.

In a third general aspect, the present invention provides an electrical circuit signal coupling analysis system for modeling the electrical interactions between functional components of a microelectronic package, said analysis system comprising: an electrical system formed in said microelectronic package, said electrical system including a plurality of functional components, wherein said functional components are signal vias, power supply vias, signal wires, and conductive planes; an overall model of the electrical system, wherein said overall model is a representation of the electrical system as a plurality of cells having typically uniform length, width, and height dimensions, said length and width dimensions typically substantially equal to one another and are dependent on a fraction of the fastest signal rise time, said height dimension being dependent on power plane separation in the package, and wherein each cell has at least one directly neighboring cell which is a direct neighbor, wherein directly neighboring cells share a common face therebetween; a plurality of intra-cell models, each intra-cell model representing the electrical interactions between functional components which are located within a particular cell; a plurality of inter-cell models, each inter-cell model representing the electrical interactions between functional components which are located within directly neighboring cells; and extraction means for deriving data corresponding to the electrical interactions which result from the intra-cell models and the inter-cell models.

In a fourth general aspect, the present invention provides a method of extracting a model, the method comprising: determining a first dimension derived from a fraction of the wavelength corresponding to the knee frequency; and subdividing a circuit into uniform circuit subdivisions, wherein each circuit subdivision has a length and a width dimension equal to or less than said first dimension; combining said circuit subdivisions to create said model.

The foregoing and other features and advantages of the invention will be apparent from the following more particular description of embodiments of the invention. It is to be understood that both the foregoing general description and the following detailed description are exemplary, but are not restrictive, of the invention.

BRIEF DESCRIPTION OF DRAWINGS

The features of the present invention will best be understood from a detailed description of the invention and an embodiment thereof selected for the purposes of illustration and shown in the accompanying drawings in which:

FIG. 3A is a perspective view of a $\lambda/20$ cell in its original geometry form and including a plurality of power vias;

FIG. 3B is a perspective view of the cell of FIG. 3A in its equivalent geometry form;

FIG. 3C is an equivalent circuit diagram of the equivalent geometry of FIG. 3B;

FIG. 4A is a perspective view of two directly neighboring cells, each cell including a plurality of equivalent power vias;

FIG. 4B is a plan view of the cells of FIG. 4A showing their relative position to surrounding cells;

FIG. 4C is an equivalent circuit diagram of the equivalent geometry of FIG. 4A;

FIG. 6A is a perspective view of a cell in its original geometry form and including a plurality of signal vias;

FIG. 6B is a simplified structure of the cell of FIG. 6A;

FIG. 6C is an equivalent circuit of the simplified structure of FIG. 6B;

FIG. 7A is a perspective view of two directly neighboring cells, each cell including a plurality of signal vias;

FIG. 7B is a circuit diagram of the geometry of FIG. 7A;

FIG. 8A is a perspective view of a cell in its original geometry form including a plurality of power and signal vias;

FIG. 8B is a perspective view of the cell of FIG. 8A in its equivalent geometry form;

FIG. 8C is a circuit diagram of the equivalent geometry of FIG. 8B;

FIG. 13B is a perspective view of the cell of FIG. 13A in its equivalent geometry form including signal traces; and FIG. 13C is a perspective view of the equivalent cell of FIG. 13B depicting equivalent transmission line coupling.

DETAILED DESCRIPTION

Figure 1:
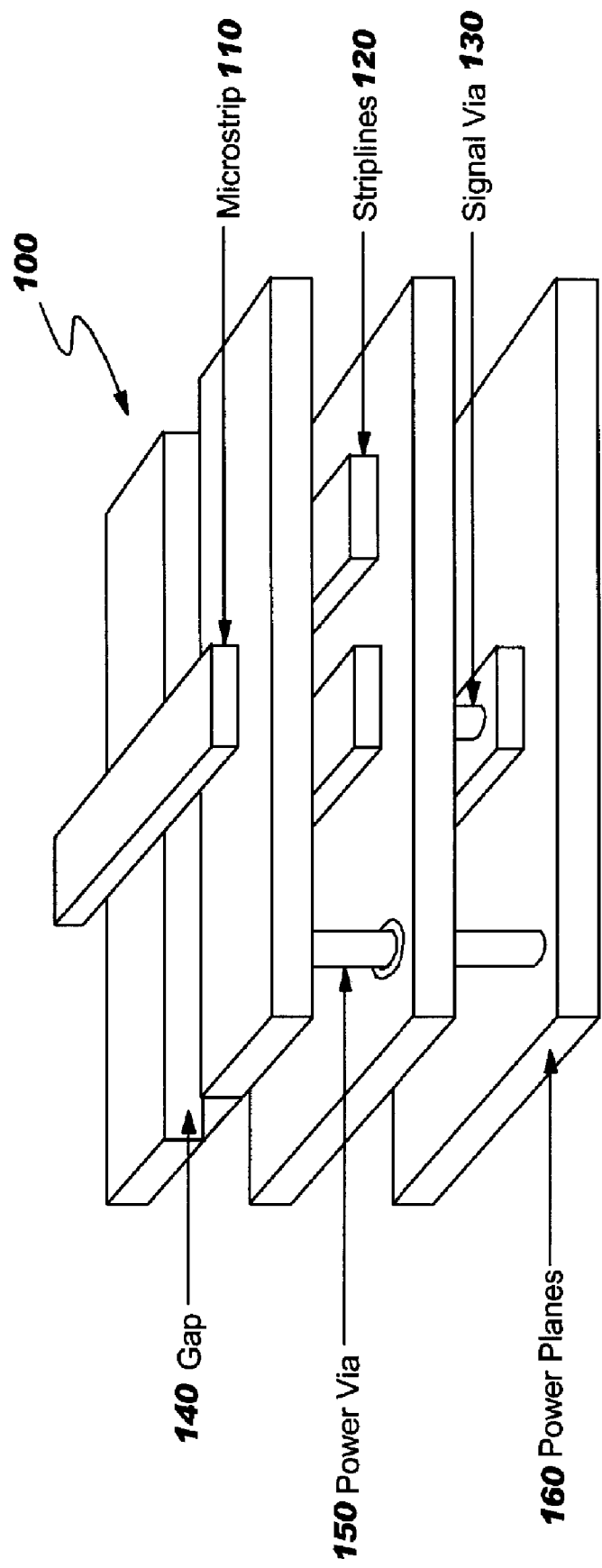
FIG. 1 is a perspective view of a representative microelectronic structures in accordance with an example of the related art.

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of an embodiment. The features and advantages of the present invention are illustrated in detail in the accompanying drawings, wherein like reference numerals refer to like elements throughout the drawings.

The invention described herein provides a method of creating a frequency-dependent electrical model of any electrical system which has a structure that can be modeled as an orthogonal geometric structure. One such electrical system is an integrated chip package which contains horizontal wires, vertical vias, and horizontal conductive planes such as, inter alia, power planes. These structures or functional components of a modern microelectronic package or card can be divided into three categories: vias, power planes, and signal wires. These features are replaced in the model with individual lumped and transmission line elements. These elements are limited in size so that each overall dimension (i.e., length, width, or height) is no larger than a fraction of the wavelength of the maximum switching frequency.

A typical power supply via is used for the transfer of power supply current vertically between power planes. A via may connect between one or more vertically stacked cells. The via may be modeled using several methodologies separately or in combination. These methodologies include self inductance, inductive coupling, capacitive coupling, distributed lumped element (RLC) coupling, or field effect (i.e., transmission line) coupling. If the via is long enough, it may need to be divided using the rise time. Signal traces carry switching signals over relatively longer distances than vias (i.e., lengths in mm). These signal traces may span more than one cell. The coupling between signal wires is modeled using a transmission line methodology. Finally, power planes vertically bound cells, and may also laterally span more than one cell. They too may be modeled with a transmission line methodology. Alternately, they may be modeled as a distributed RLC network. The power supply and signal integrity model of the present invention combines the modeling of the three basic types of functional components (i.e., vias, wires, and planes) with the concept that only adjacent cells can directly interact to produce an accurate and efficient model of the system.

In an embodiment described herein, the orthogonal geometric structure is subdivided into a plurality of cells, such as, inter alia, three-dimensional rectangular structures. The cells may be any other suitable three dimensional shape. Further, a variety of different cells may be used in combination. The present invention further teaches a maximum dimension for the cell size which is based on an operating frequency of the system. Below this maximum dimension, electromagnetic delays between components can be assumed to be zero with negligible loss of modeling accuracy. The invention also teaches that only adjacent neighboring cells may directly interact with each other. With these two ground rules, the electromagnetic behavior of any electrical system may be accurately modeled over any chosen frequency range.

Figure 12:
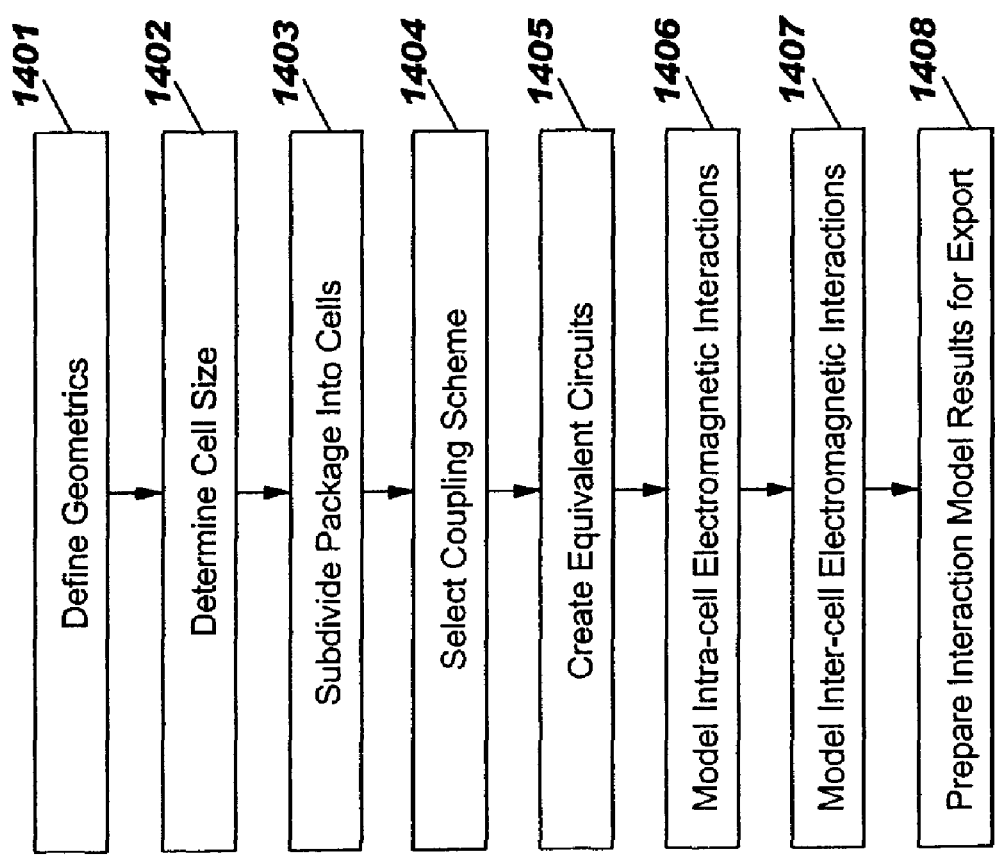
FIG. 12 is a flow chart of the method of the present invention.

Referring to FIG. 12, flow chart 1400 represents the power supply noise and signal integrity analysis method for a microelectronic package. The method is performed by a computer program utilized by a suitable computer. The initial step 1401 is to locate and define the geometries in the microelectronic package. These geometries include the structural and functional components in the microelectronic package. These components include, inter alia, signal vias, power supply vias, signal wires, and conductive or power planes. The next step 1402 includes determining an appropriate size for a cell. Each cell has a length and width, and these dimensions are usually identical both within each particular cell, and amongst different cells. These length and width dimensions are calculated from the wavelength of electromagnetic signal propagation in the medium of the microelectronic structure. This wavelength may be determined from the "knee frequency" of the signal. The knee frequency is defined as the frequency below which at least ninety percent of the switching energy is contained. In one embodiment, the length and width dimension is one-twentieth of the wavelength (i.e., $\lambda/20$). The height of each cell may not exceed the power plane separation in the structure, and it can never be more than $\lambda/20$. The height is usually determined by the thickness of the power plane separation. The microelectronic package geometries are subdivided into a grid wherein each box in the grid is one of the cells of step 1403. Note that a cell may need to be smaller than $\lambda/20$, as in the case of densely spaced external connections to the microelectronic structure. In order not to alter the current distribution within the structure, each surface cell must connect to no more than one source of external current. Hence, the size of the cells is defined by $\lambda/20$ or the pitch of the external connections, whichever is smaller. In step 1404, the type of coupling scheme is selected. This coupling scheme may be selected from inductive coupling, capacitive coupling, lumped element (RLC) coupling or field effect (transmission line) coupling. In the present invention, a preferred embodiment is to use field effect (transmission line) coupling because it is considered to be more computationally efficient than other schemes, since it employs a lower element count.

In step 1405, the functional components located within each cell are reduced to equivalent circuits. Each geometry (i.e., vias, wires, planes) is represented with an equivalent resistance, capacitance, inductance, transmission line, mutual capacitance, or mutual inductance, using either a lumped element coupling scheme or a field effect (i.e., transmission line) coupling scheme, as selected in step 1404. Each lumped element is assigned a resistance, capacitance, or inductance value. In the next step 1406, the electromagnetic interactions between the functional components within each cell, as modeled by their equivalent circuits, are extracted.

The extraction continues in step 1407, wherein electromagnetic interactions which occur between individual cells are represented. However, only those cells which are orthogonal and adjacent cells are assumed to interact. Adjacent cells are those two cells which have an entire face shared between them. See, for example, FIG. 4B, infra.

Finally, in step 1408, the final system model analysis results of the intra-cell and inter-cell interactions are prepared as data suitable for input to a circuit simulator such as, inter alia, SPICE. The final system model yields a standard SPICE deck capable of being used to accurately simulate all the high speed effects in the system, such as, inter alia, signal integrity, noise and resonance on power supplies.

Referring to FIG. 1, there is illustrated a perspective view of a representative microelectronic package structure 100 of the related art. Microelectronic package structure 100 includes various components which are commonly found in a microelectronic package. These components include a microstrip 110, formed of a conductive material, and which is used to connect the microelectronic package structure 100 to adjoining package structures (not shown), or to make intraconnections within microelectronic package structure 100. For example, in the illustrated embodiment, microstrip 110 is used to bridge gap 140.

Microelectronic package structure 100 also includes several power planes 160 arranged vertically directly neighboring one another. The power planes 160 are connected to each other with power supply vias 150. Similarly, signal vias 130 are used to vertically interconnect signal carrying striplines 120.

To begin formulating the model in accordance with the present invention, the user inputs the maximum signal knee frequency (or, alternatively, the minimum signal rise time) to be used in the system to be modeled (i.e., the card or package). Simple equations are then applied to determine the fastest signal rise time in the medium from which the structure is constructed. A small fraction of this wavelength is used to define the dimensions of a three-dimensional cell, i.e., the "cube". The structure is then divided into such cells. Each cell is small enough that propagation delay within the cell can be neglected. These propagation effects, that is, the instantaneous interactions between components are assumed to be so small that they have essentially no effect on the analysis, which is the so-called "lumped element assumption" known in the art. The minimum signal transition time within the structure is thus taken into account.

Figure 2:
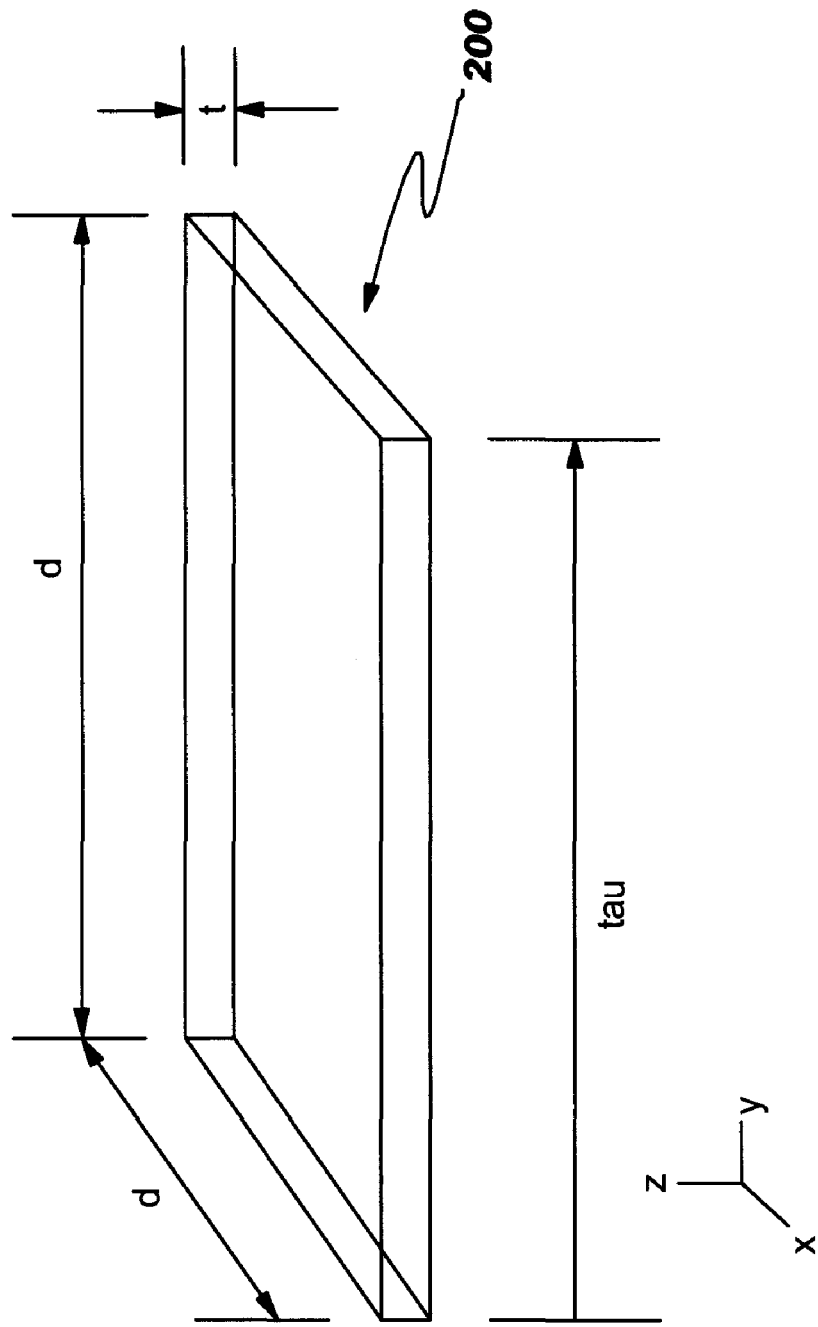
FIG. 2 is a perspective view of a $\lambda/20$ cell of the present invention.

As shown in FIG. 2, each cell 200 has sides no larger than a dimension, d, which is proportional to the wavelength, λ. For example, in one embodiment, d=(λ/20). The overall structure is then geometrically divided into the cells whose sides are no larger than d. Since each cell is by definition electrically small, inside each cell 200, all electrical effects can be assumed to happen instantly with negligible loss of modeling accuracy. Further, within each cell 200, the electrical interactions of vias, signal wires, and power planes may be modeled either as transmission lines, or with lumped elements, namely inductors, capacitors, and resistors. In other alternative embodiments, such modeling may also include inductive coupling or capacitive coupling models. The values of these lumped elements are calculated using standard equations. These individual components are equivalent representations of the electrical interaction of wire segments, planes, or vias within or between cells. Once RLC values for the lumped elements inside each cell are calculated, interactions between directly neighboring cells are calculated, including field effect (transmission line) coupling impedances, mutual inductances and capacitances, and resistances. For the purposes of the model, only directly neighboring cells are assumed to interact with each other. The number of elements in the model can be reduced significantly by removing those lumped elements having values smaller than some predetermined value, either within cells or between cells, thereby reducing simulation resources. At very high frequencies, every inductor and capacitor has a resistor, or some other parasitic L, C, or R component, in parallel and in series with it, representing eddy currents and dielectric losses, respectively. The methodology of the present invention omits these parasitic components at low frequencies but not at high frequencies, since in the former case, their effects are so small as to be negligible. However, in alternative embodiments of the present invention, the parasitic components could be considered if so desired.

FIG. 2 illustrates a λ/20 cell 200 of the present invention. The cell 200 has a maximum side dimension defined by 1/20 of the minimum wavelength of the signal knee frequency ($F_{knee}$) as defined by the minimum signal transition time ($T_r$). This minimum signal transition time is defined as the rise time of the signal from one level to another. This arrangement limits the signal phase shift within each cell 200 to a value less than approximately 18 degrees. In this methodology, the minimum signal transition time $T_r$ in the system to be modeled has dimensions in picoseconds (ps). Further the speed of light in the medium, $C_m$, has dimensions in mm/ps.

Referring to FIG. 2, the cell 200 dimensions and characteristics are as follows. The length of side d is defined such that tau (τ) is less than or equal to $T_r/5$, where τ is the flight time of the signal across the cell. Then the following relationships in addition to $\tau=(T_r/5)$ [ps] may be defined:

$$d=(C_m T_r/5)=\lambda_{min}/20=(C_m/F_{knee})/20=(C_m*4T_r)/20 \text{ [mm]}$$

$$t \leq d \text{ [mm]}$$

As noted above, when the structure is divided into cells, the cells must not cross or subdivide reference planes, such as, power planes 160 in FIG. 1. The vertical dimension t is usually defined by the reference plane pitch of the structure. Also, the maximum fundamental frequency in the system to be modeled is defined as:

$$F_{knee}=(\tfrac{1}{4}T_r)=(0.25/T_r)[Hz]$$

Note that $F_{knee}$ is often defined in related literature as ($0.35/T_r$).

The dimensions of the cell depicted in FIG. 2 are defined such that the flight time τ (i.e., the delay time required for a signal to pass from one end of the cell to the other) across any cell in the structure is at most ⅕ of the minimum signal transition time in the structure.

Examples of various modeling schemes are illustrated below.

Intra-cell Power Supply Vias Equivalent

FIG. 3A shows an embodiment wherein a plurality of intra-cell power supply vias are shown. In the cell 300, the original geometry is shown in which there are three sets of power supply vias 310, 320, 330 which correspond to three different power supply networks. FIG. 3B shows an embodiment of the equivalent geometry as cell 358 containing only three power supply equivalent vias (G, V, Vx) 350, 360, 370.

FIG. 3C shows a circuit diagram of the equivalent circuit 340 using the lumped element (RLC) scheme. Each power supply equivalent via (G, V, Vx) 350, 360, 370 is simulated by the series combination of an inductor and a resistor, while coupling between power supply vias is simulated by a capacitor and a mutual inductance. For example, the model of first power supply via (V1 to V2) 360 includes inductor (Lv) 361 in series with resistor (Rv) 362. The model of second power supply via (G1 to G2) 350 includes inductor (Lg) 351 in series with resistor (Rg) 352. The model of third power supply via (Vx1 to Vx2) 370 includes inductor (Lvx) 371 in series with resistor (Rvx) 372. Capacitor (Cvg) 363 represents capacitive coupling between first power supply via (V1 to V2) 360 and second power supply via (G1 to G2) 350. Capacitor (Cvxg) 353 represents capacitive coupling between second power supply via (G1 to G2) 350 and third power supply via (Vx1 to Vx2) 370. Capacitor (Cwx) 373 represents capacitive coupling between first power supply via (V1 to V2) 360 and third power supply via (Vx1 to Vx2) 370. Similarly, mutual inductance (Lmvg) 364 represents the inductive coupling between first power supply via (V1 to V2) 360 and second power supply via (G1 to G2) 350. Mutual inductance (Lmvxg) 354 represents the inductive coupling between second power supply via (G1 to G2) 350 and third power supply via (Vx1 to Vx2) 370. Mutual inductance (Lmwx) 374 represents the inductive coupling between first power supply via (V1 to V2) 360 and third power supply via (Vx1 to Vx2) 370.

The effects of parasitic resistances in parallel with each inductor and each capacitor become nonnegligible at frequencies above a few GHz, but these parasitic resistive elements may be omitted without loss of accuracy at lower frequencies, and are so omitted in FIG. 3C. These parasitic resistances also exist in each of the circuit equivalents discussed below, but are similarly omitted for simplicity.

Inter-cell Power Supply Vias Equivalent

FIG. 4A shows an embodiment wherein the interaction of two orthogonally directly neighboring cells is modeled. Center cell 410 and directly neighboring East cell 420 are shown. The orientations "Center" and "East" are shown in the plan view of FIG. 4B. Relative to center cell 410 each of the North cell 450, East cell 420, South cell 430, and West cell 440 are an orthogonally adjacent, direct neighbor to Center cell 410. Each of the Center cell 410 and the East cell 420 contain a simulation model representing three intra-cell power supply vias equivalents, as discussed supra. It is further assumed that only adjacent cells interact. Center cell 410 includes the equivalent intra-cell power supply vias 411, 412 and 413. East cell 420 includes the equivalent intra-cell power supply vias 421, 422 and 423.

FIG. 4C illustrates a circuit diagram of the equivalent circuit 460 using the lumped element (RLC) scheme to simulate power via coupling between the Center cell 410 and the East cell 420 along their shared edge 415. Inductor (Lv) 461 represents first equivalent power supply via (Vt to Vb) 411 in Center cell 410. Inductor (Lve) 462 represents first equivalent power supply via (Vte to Vbe) 421 in East cell 420.

Additional coupling capacitors and mutual inductance may be discerned from FIG. 4C. For example, inductor (Lg) 465 represents second equivalent power supply via (Gt to Gb) 412 in Center cell 410. Inductor (Lve) 466 represents second equivalent power supply via (Gte to Gbe) 422 in East cell 420.

Inductor (Lvx) 469 represents third equivalent power supply via (Vxt to Vxb) 413 in Center cell 410. Inductor (Lvxe) 470 represents third equivalent power supply via (Vxte to Vxbe) 423 in East cell 420.

Coupling between power supply via equivalents 411 and 421 is simulated by a capacitor 463 and mutual inductance K_411_421. The factor "K" is the HSPICE® reference for a mutual inductance. Coupling between power supply via equivalents 411 and 422 is simulated by a capacitor 473 and mutual inductance K_411_422. Coupling between power supply via equivalents 411 and 423 is simulated by capacitor 479 and mutual inductance K_411_423. Coupling between power supply via equivalents 412 and 421 is simulated by a capacitor 475 and mutual inductance K_412_421. Coupling between power supply via equivalents 412 and 422 is simulated by a capacitor 467 and mutual inductance K_412_422. Coupling between power supply via equivalents 412 and 423 is simulated by a capacitor 474 and mutual inductance K_412_423. Coupling between power supply via equivalents 413 and 421 is simulated by a capacitor 477 and mutual inductance K_413_421. Coupling between power supply via equivalents 413 and 422 is simulated by a capacitor 478 and mutual inductance K_413_422. Coupling between power supply via equivalents 413 and 423 is simulated by a capacitor 471 and mutual inductance K_413_423.

Intra- and Inter-cell Power Plane Equivalent

Figure 5A:
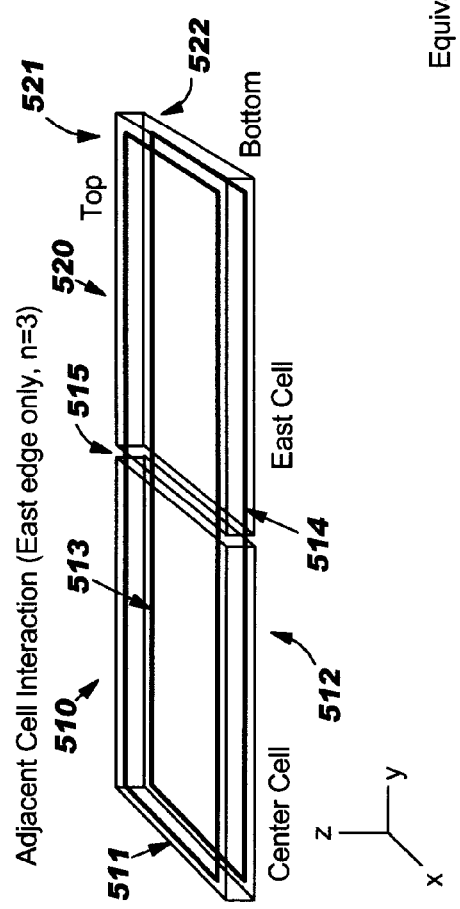
FIG. 5A is a perspective view of two directly neighboring cells, each cell including one power planes.

FIG. 5A illustrates the interaction between two directly neighboring cells, a Center cell 510 and an East cell 520, having power planes 513 and 514 which lie within and between the two cells 510 and 520. Each cell 510, 520 has a top surface 511, 521 and a bottom surface 512, 522. In this scenario, a power plane 513 or 514 must cross the cell boundary for an intercell inductance to be present. The power planes might not connect to any vias, or they might form a dead-end DC path.

Figure 5B:
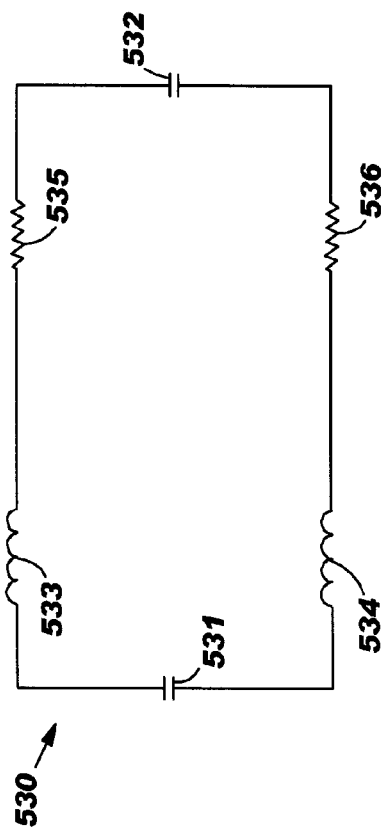
FIG. 5B depicts a one-dimensional equivalent circuit diagram of the geometry of FIG. 5A.

The circuit diagram of the equivalent circuit 530 using the lumped element (RLC) scheme to simulate connection between the plate metal of Center cell 510 and the plate metal of East cell 520 along their shared edge 515 is shown in FIG. 5B. The plate capacitance in Center cell 510 between the top surface (T) 511 and the bottom surface (B) 512 is modeled by capacitor (Cplate) 531. Similarly, the plate capacitance in the East cell 520 between the top surface (TE) 521 and the bottom surface (BE) 522 is modeled by capacitor (Cplate_E) 532. The top plate 513 is modeled with a first inductor (½ Lplate) 533 in series combination with a first resistor (Rplate) 535. The bottom plate is similarly modeled with a second inductor (½Lplate) 534 in series combination with a second resistor (Rplate) 536.

Figure 5D:
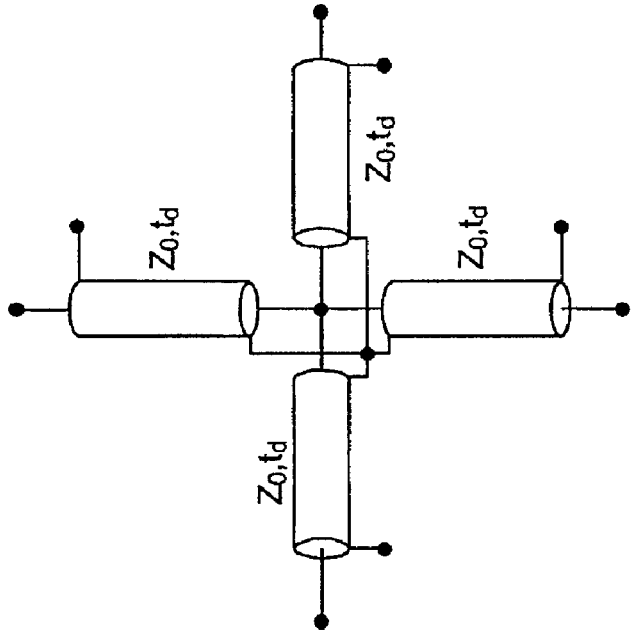
FIG. 5D depicts two transmission-line equivalent circuit diagrams of each cell of FIG. 5A, each of which may be tiled in two dimensions.
Figure 5C:
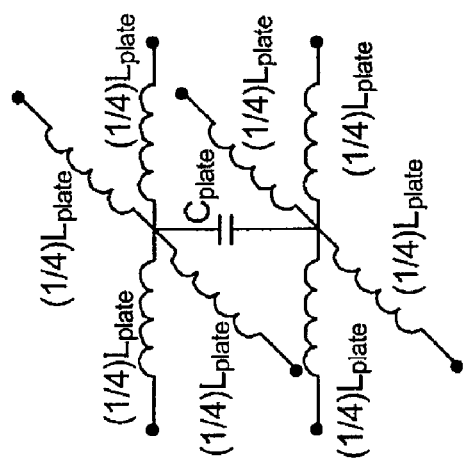
FIG. 5C depicts two RLC equivalent circuit diagrams of each cell of FIG. 5A, each of which may be tiled in two dimensions.

FIGS. 5A and 5B deal with the case of one-dimensional tiling of cells. The more general case is that of two-dimensional tiling. FIG. 5C depicts two equivalent RLC circuits of a cell when tiling needs to be done in two dimensions. FIG. 5D shows a transmission-line equivalent circuit of the RLC circuits of FIG. 5C. In the equations for Lplate of FIG. 5D, μ is the magnetic permeability of the dielectric between the two power planes. Any of the three circuits depicted in FIGS. 5C and 5D may be used for two-dimensional tiling, as they are electrically equivalent.

Intra-cell Signal Vias Equivalent

FIG. 6A shows an embodiment wherein a plurality of intra-cell signal vias are shown. In the cell 600, the original geometry is shown in which there are three sets of vias 610, 620, 630 which correspond to three different signal networks. FIG. 6B shows an embodiment of the equivalent geometry as cell 658 containing only three sample signal vias (S1, S2, S3) 650, 660, 670.

FIG. 6C shows a diagram of the equivalent circuit using the lumped element (RLC) scheme. Each equivalent signal via (S1, S2, S3) 650, 660, 670 is simulated by the series combination of an inductor and a resistor, while coupling between vias is simulated by a capacitor and mutual inductance. For example, the model of first signal via (S1T to S1B) 650 includes inductor (Lv) 661 in series with resistor (Rv) 662. The model of second signal via (S2T to S2B) 660 includes inductor Lg 651 in series with resistor (Rg) 652. The model of third signal via (S3T to S3B) 670 includes inductor Lvx 671 in series with resistor (Rvx) 672. Capacitor (Cvg) 663 represents capacitive coupling between first signal via (S1T to S1B) 650 and second signal via (S2T to S2B) 660. Capacitor (Cvxg) 653 represents capacitive coupling between second signal via (S2T to S2B) 660 and third signal via (S3T to S3B) 670. Capacitor (Cwx) 673 represents capacitive coupling between first signal via (S1T to S1B) 650 and third signal via (S3T to S3B) 670. Similarly, inductor (Lmvg) 664 represents the mutual inductance coupling between first signal via (S1T to S2T) 650 and second signal via (S2T to S2B) 660. Inductor (Lmvxg) 654 represents the mutual inductance coupling between second signal via (S2T to S2B) 660 and third signal via (S3T to S3B) 670. Inductor (Lmwx) 674 represents the mutual inductance coupling between first signal via (S1T to S2T) 650 and third signal via (S3T to S3B) 670.

Inter-cell Signal Vias Equivalent

FIG. 7A shows an embodiment wherein the interaction of two orthogonally directly neighboring cells is modeled. Center cell 710 and directly neighboring East cell 720 are shown. Each of the center cell 710 and the East cell 720 contain a simulation model representing three intra-cell signal via equivalents, as discussed supra. It is further assumed that only orthogonally directly neighboring cells interact. Center cell 710 includes the equivalent intra-cell signal vias 711, 712 and 713. East cell 720 includes the equivalent intra-cell signal vias 721, 722 and 723.

FIG. 7B illustrates a circuit diagram of the equivalent circuit 760 using the lumped element (RLC) scheme to simulate signal via coupling between the Center cell 710 and the East cell 720 along their shared edge 715. Inductor (Lv) 761 represents first equivalent signal via (Vt to Vb) 711 in Center cell 710. Inductor (Lve) 762 represents first equivalent signal via (Vte to Vbe) 721 in East cell 720. Coupling between these signal via equivalents 711, 721 is simulated by a capacitor 763 and an inductor K_711_721. Additional corresponding coupling capacitors and inductors may be discerned from FIG. 7B.

Coupling between power supply via equivalents 711 and 721 is simulated by a capacitor 763 and mutual inductance K_711_721. The factor "K" is the HSPICE® reference for a mutual inductance. Coupling between power supply via equivalents 711 and 722 is simulated by a capacitor 773 and mutual inductance K_711_722. Coupling between power supply via equivalents 711 and 723 is simulated by a capacitor 779 and mutual inductance K_711_723. Coupling between power supply via equivalents 712 and 721 is simulated by a capacitor 775 and mutual inductance K_712_721. Coupling between power supply via equivalents 712 and 722 is simulated by a capacitor 767 and mutual inductance K_712_722. Coupling between power supply via equivalents 712 and 723 is simulated by a capacitor 774 and mutual inductance K_712_723. Coupling between power supply via equivalents 713 and 721 is simulated by a capacitor 777 and mutual inductance K_713_721. Coupling between power supply via equivalents 713 and 722 is simulated by a capacitor 778 and mutual inductance K_713_722. Coupling between power supply via equivalents 713 and 723 is simulated by a capacitor 771 and mutual inductance K_713_723.

Intra-cell Signal and Power Supply Vias Equivalent

FIG. 8A shows an embodiment wherein a plurality of intra-cell power supply vias and a signal via are shown. In the cell 800, the original geometry is shown in which there are two sets of power supply vias 810, 820 which correspond to two different power supply networks. There is also a set of signal vias 830 which correspond to a signal network. FIG. 8B shows an embodiment of the equivalent geometry as cell 858 containing only two power supply vias (G, Vx) 850, 860 and a signal via (S1) 870.

FIG. 8C illustrates a circuit diagram of the equivalent circuit 840 using the lumped element (RLC) scheme to simulate signal coupling between the power supply vias (G, Vx) 850, 860 and a signal via (S1) 870. Each power supply equivalent via (G, Vx) 850, 860 is simulated by the series combination of an inductor and a resistor, while coupling between power supply vias is simulated by a capacitor and an inductor. For example, the model of first power supply via (G1 to G2) 850 includes inductor (Lg) 851 in series with resistor (Rg) 852. The model of second power supply via (Vx1 to Vx2) 860 includes inductor (Lvx) 861 in series with resistor (Rvx) 862. The model of the signal via (S1 to S2) 870 includes inductor (Ls1) 871 in series with resistor (Rs1) 872. Capacitor (Cvxg) 863 represents capacitive coupling between second power supply via (Vx1 to Vx2) 860 and first power supply via (G1 to G2) 850. Capacitor (Cgs1) 853 represents capacitive coupling between first power supply via (G1 to G2) 850 and signal via (S1 to S2) 860. Capacitor (Cvxs) 873 represents capacitive coupling between second power supply via (Vx1 to Vx2) 860 and signal via (S1 to S2) 870. Similarly, inductor (Lmvxg) 864 represents the mutual inductance coupling between second power supply via (Vx1 to Vx2) 860 and first power supply via (G1 to G2) 850. Inductor (Lmgs) 854 represents the mutual inductance coupling between first power supply via (G1 to G2) 850 and signal via (S1 to S2) 870. Inductor (Lmvxs) 874 represents the mutual inductance coupling between second power supply via (Vx1 to Vx2) 860 and signal via (S1 to S2) 870.

Inter-cell Signal and Power Supply Vias Equivalent

Figure 9A:
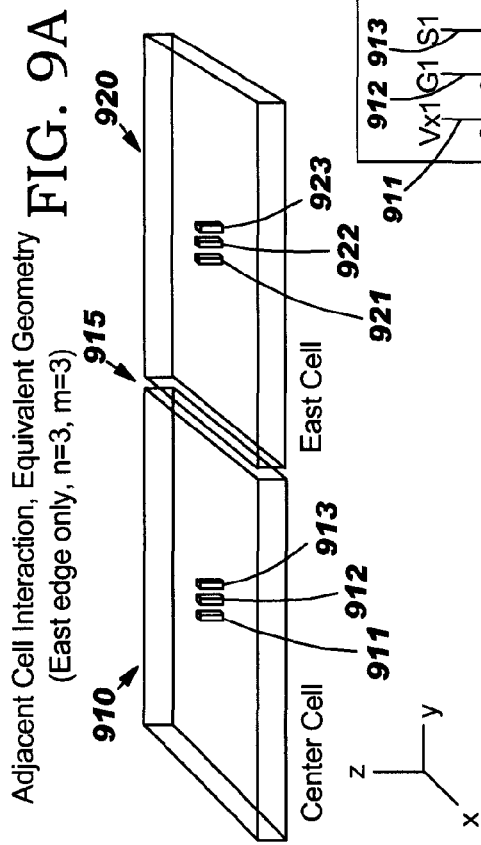
FIG. 9A is a perspective view of two directly neighboring cells, each cell including a plurality of equivalent power vias and signal vias.

FIG. 9A shows an embodiment wherein the interaction of two orthogonally directly neighboring cells is modeled. Center cell 910 and directly neighboring East cell 920 are shown. Each of Center cell 910 and East cell 920 contain a simulation model representing two intra-cell power supply via equivalents and one intra-cell signal via equivalent, as discussed supra. It is further assumed that only orthogonally directly neighboring cells interact. Center cell 910 includes the equivalent intra-cell power supply vias 911, 912 and intra-cell signal via 913. East cell 920 includes the equivalent intra-cell power supply vias 921, 922 and intra-cell signal via 923.

Figure 9B:
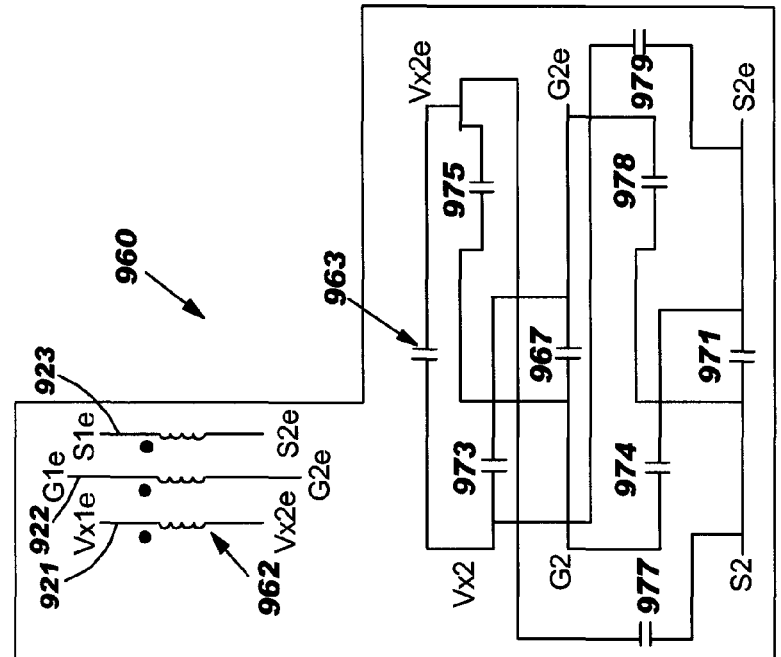
FIG. 9B is a circuit diagram of the geometry of FIG. 9A.

FIG. 9B illustrates a circuit diagram of the equivalent circuit 960 using the lumped element (RLC) scheme to simulate coupling between Center cell 910 and East cell 920 along their shared edge 915. Inductor (Lvx) 961 represents first equivalent power supply via 911 in Center cell 910. Inductor (Lvxe) 962 represents first equivalent power supply via 921 in East cell 920.

Coupling between power supply via equivalents 911 and 921 is simulated by a capacitor 963 and mutual inductance K_911_921. The factor "K" is the HSPICE® reference for a mutual inductance. Coupling between power supply via equivalents 911 and 922 is simulated by a capacitor 973 and mutual inductance K_911_922. Coupling between power supply via equivalent 911 and signal via equivalent 923 is simulated by mutual capacitance 979 and mutual inductance K_911_923. Coupling between power supply via equivalents 912 and 921 is simulated by a capacitor 975 and mutual inductance K_912_921. Coupling between power supply via equivalents 912 and 922 is simulated by a capacitor 967 and mutual inductance K_912_922. Coupling between power supply via equivalent 912 and signal via equivalent 923 is simulated by a capacitor 974 and mutual inductance K_912_923. Coupling between signal via equivalent 913 and power supply via equivalent 921 is simulated by a capacitor 977 and mutual inductance K_913_921. Coupling between signal via equivalent 913 and power supply via equivalent 922 is simulated by a capacitor 978 and mutual inductance K_913_922. Coupling between signal via equivalent 913 and power supply via equivalent 923 is simulated by a capacitor 971 and mutual inductance K_913_923.

Intra-cell Signal Wires Equivalent

Figure 10B:
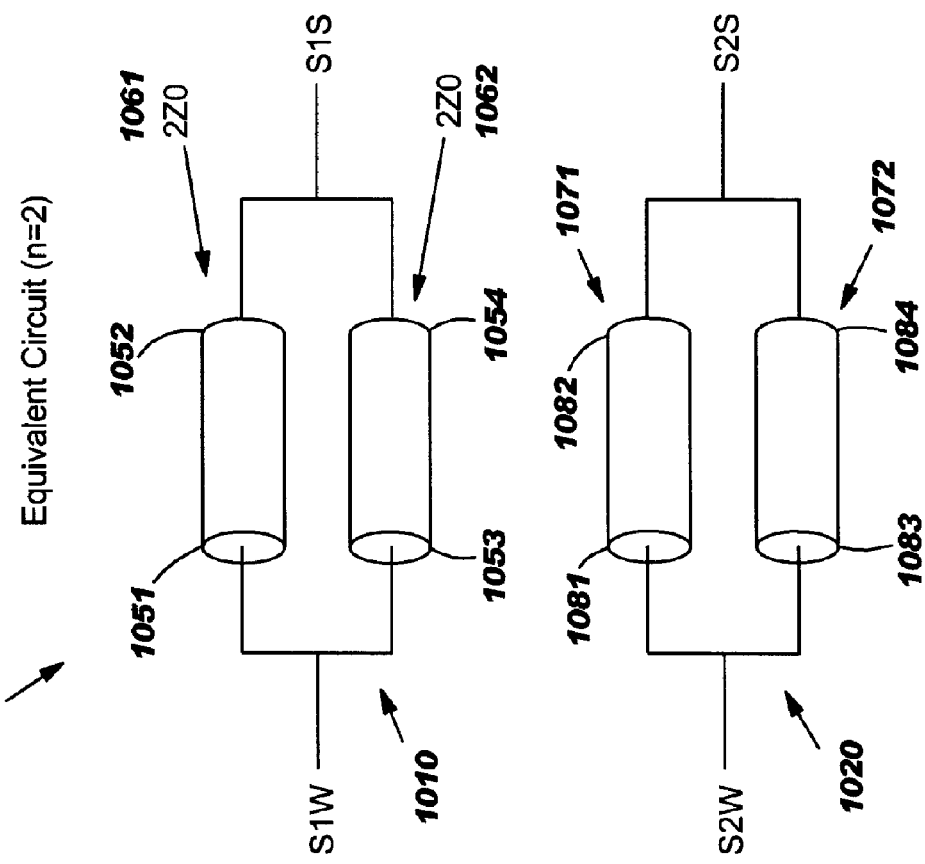
FIG. 10B is an equivalent lossy transmission line diagram of the geometry of FIG. 10A.
Figure 10A:
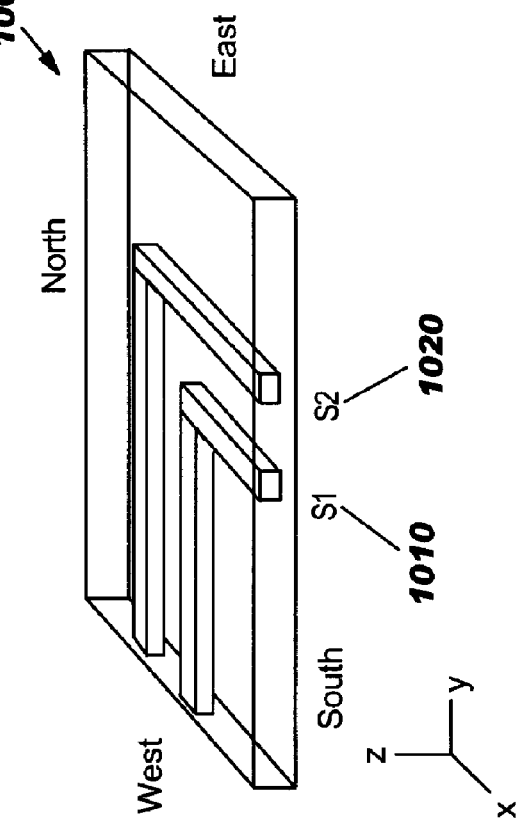
FIG. 10A is a perspective view of a cell in its original geometry form and including a plurality of signal wires.

FIG. 10A shows an embodiment wherein a plurality of intra-cell signal wires are shown. In cell 1000, the original geometry is shown in which there are two signal wires 1010, 1020 respectively.

FIG. 10B shows a circuit diagram of the equivalent circuit using a lossy or lossless transmission line scheme. Each signal wire 1010, 1020 is simulated by the parallel combination of first and second transmission line segments. First signal wire (S1) 1010 is modeled by first transmission line segment 1061 in parallel combination with second transmission line segment 1062. Each of first transmission line segment 1061 and second transmission line segment 1062 represent an impedance of $2Z_0$, where $Z_0$ is the characteristic impedance of the signal wire (S1) 1010. Also, first transmission line segment 1061 has first and second reference points 1051, 1052, respectively. Second transmission line segment 1062 has first and second reference points 1053, 1054, respectively. Similarly, second signal wire (S2) 1020 is modeled by third transmission line segment 1071 in parallel combination with fourth transmission line segment 1072. Each of third transmission line segment 1071 and fourth transmission line segment 1072 is represented by an impedance of $2Z_0$, where $Z_0$ is the characteristic impedance of the signal wire (S2) 1020. Also, third transmission line segment 1071 has first and second reference points 1081, 1082, respectively. Fourth transmission line segment 1072 has first and second reference points 1083, 1084, respectively. Note that the two transmission line segments 1061, 1062, when combined, have an equivalent total impedance of $Z_0$.

Intra-cell Signal Wires to Power-Plane Equivalent

Figure 11B:
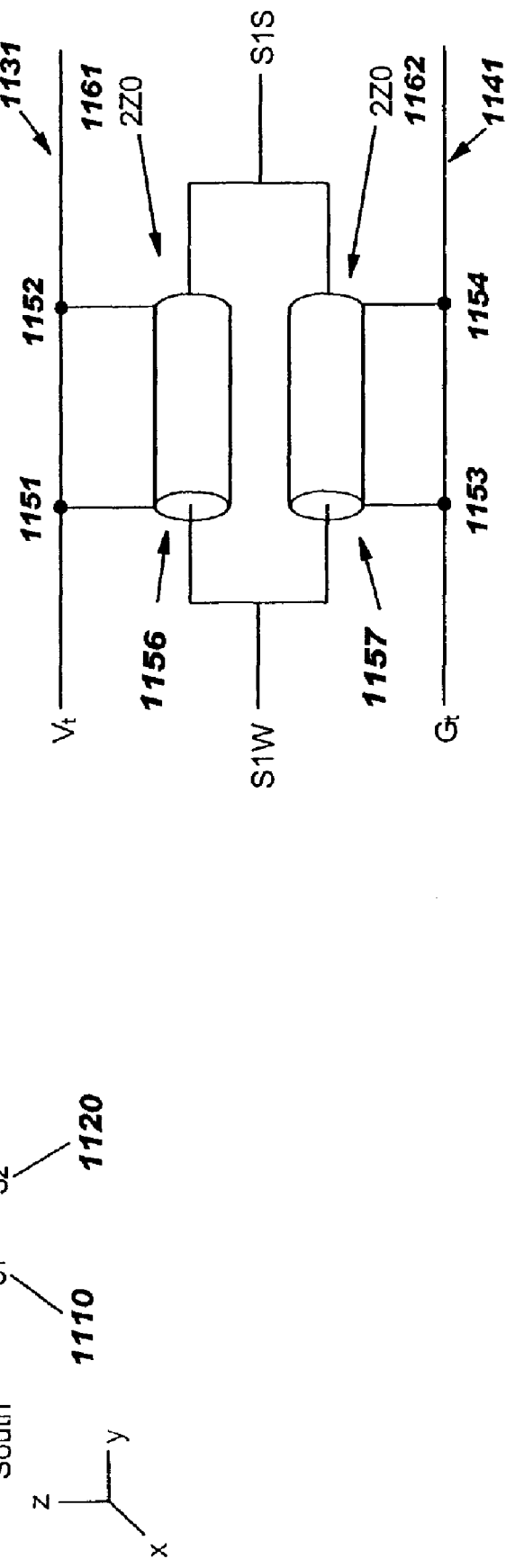
FIG. 11B is an equivalent lossy transmission line diagram of the geometry of FIG. 11A.
Figure 11A:
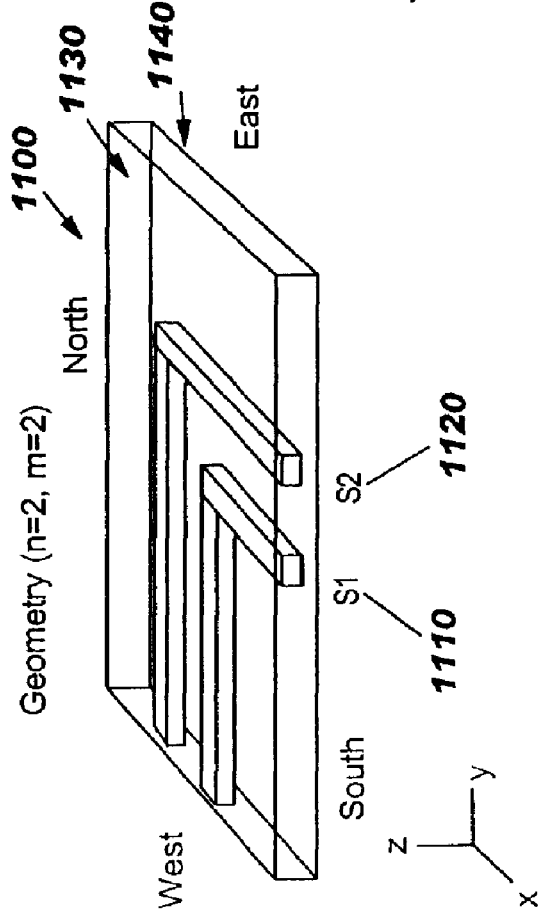
FIG. 11A is a perspective view of a cell in its original geometry form and including a plurality of signal wires and a power plane.

FIG. 11A shows an embodiment wherein a plurality of intra-cell signal wires are shown located in the same cell. In cell 1100, there are first (S1) and second (S2) signal wires 1110, 1120 respectively, and power planes (Vt, Gt) 1130, 1140 respectively.

FIG. 11B shows a circuit diagram of the equivalent circuit using a lossy transmission line scheme. The interaction between first signal wire (S1) 1110 and the power planes (Vt, Gt) 1130, 1140 is modeled by a parallel combination of first and second transmission line segments. First signal wire (S1) 1110 is modeled by first transmission line segment 1156 in parallel combination with second transmission line segment 1157. Each of first transmission line segment 1156 and second transmission line segment 1157 represent an impedance of $2Z_0$, where $Z_0$ is the characteristic impedance of first signal wire (S1) 1110. First reference point 1151 and second reference point 1152 model the referencing of first transmission line segment 1156 to first power plane model (Vt) 1131. Third reference point 1153 and fourth reference point 1154 model the referencing of second transmission line segment 1157 to second power plane model (Gt) 1141.

Signal Wire Coupling Using Transmission Lines

In an alternative embodiment, signal wire coupling may be simulated using a field-variant system utilizing transmission line models. An advantage of this scheme is simplified computation of the simulation, because the number of components required to describe coupling within a system is dramatically reduced. Signal wire coupling has previously been thought of as an "N-squared" computational problem. That is, for N signal wires there would be (N×N) coupling interactions. This transmission line scheme reduces the coupling interactions to an (N−1) computational problem. In this scheme, only line-of-sight adjacent cells interact directly, through the transmission line connected between them. Coupling to neighbors further away happens in a leap frog fashion.

At high frequencies, a microelectronic package behaves as a group of conductive skins immersed within a dielectric material. The opposing skins of a signal wire and its adjacent signal wire neighbors (i.e., only those for which there is a line of sight path) may be considered as parallel plate capacitors, and the capacitance between them may be calculated.

Figure 13A:
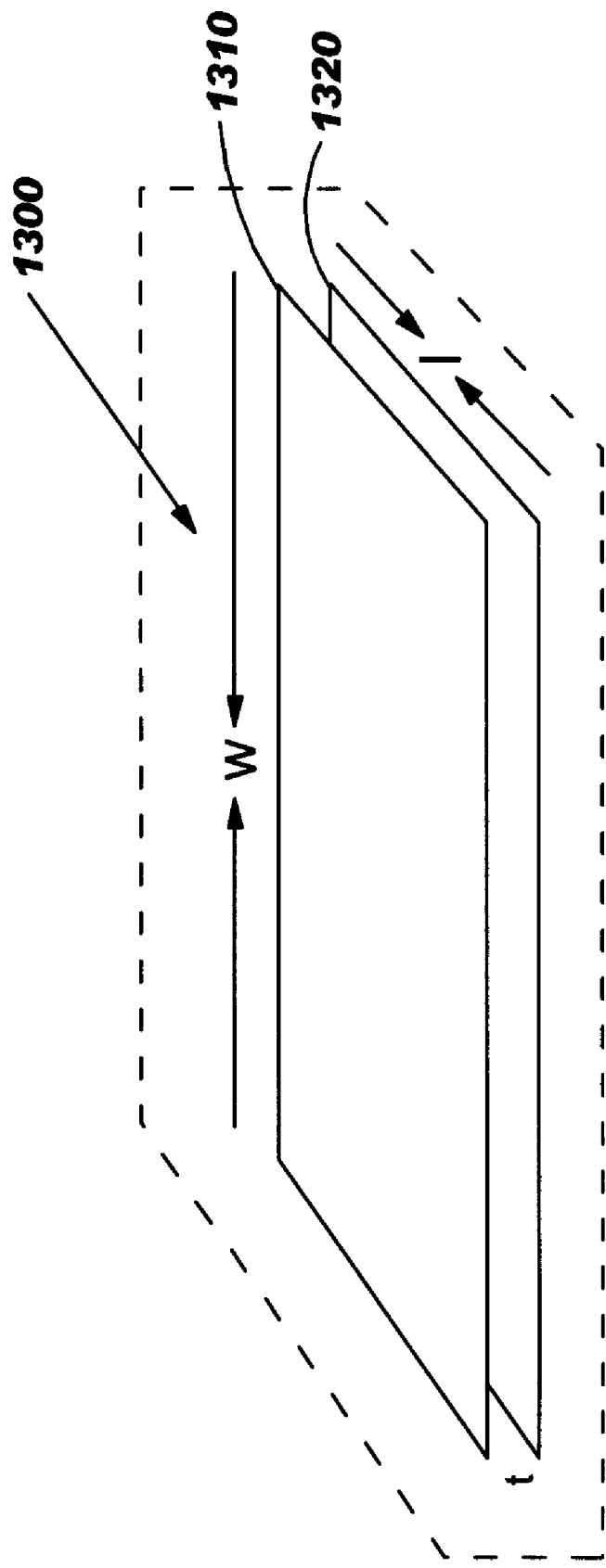
FIG. 13A is a perspective view of a cell in its original geometry form and including two power planes.

By way of explanation of the scheme of modeling signal wire coupling using transmission line models, and referring to FIG. 13A, a λ/20 cell (shown in phantom) contains pair of power planes 1310, 1320 as illustrated, each having a width w, a length l, and separated by a distance t. The power planes 1310, 1320 form a plate capacitor 1300. The impedance of the λ/20 cell which includes a portion of the power planes may be represented by the equation:

$$Z_p = \tau/C_{plate} \text{ [ohms]}$$

where τ is the delay time required for a signal to pass from one end of the cell to the other, and C is the plate capacitance.

The delay time τ may be expressed as:

$$\tau = \{l^*(\epsilon_r)^{-1/2}\}/c \text{ [seconds]}$$

$$C_{plate} = \{\epsilon_0 \epsilon_r Wl\}/t \text{ [Farads]}$$

$$Z_p = t/\{W c \epsilon_0(\epsilon_r)^{-1/2}\} \text{ [ohms]}$$

In the above equations, c is a constant representing the speed of light in a vacuum, $\epsilon_0$ represents the free space permittivity, and $\epsilon_r$ represents the dielectric constant of the medium.

A signal wire coupling representation is shown with reference to FIG. 13B. First 1340 and second 1350 signal wires are shown separated by a gap of widths, with reference planes 1345 above and/or below. Each signal wire 1340 and 1350 has a length l and a height h. The impedance between any two coupled signal wires may be derived by analogy with the plate capacitance example, supra, since opposing faces of the first and second signal wires 1340 and 1350 form a plate capacitance (i.e., turn the plate capacitor 1300 on its edge, and replace t with s, and w with h). Then, the impedance between the signal wires may be represented by the equation:

$$Z_{coupled\ wire} = s/\{h\ c\ \epsilon_0(\epsilon_r)^{-1/2}\} \text{ [ohms]}$$

Fringe capacitance, which is not included in the equations above, will increase $C_{plate}$, thereby decreasing $Z_{coupled\ wire}$. Likewise, decreasing the gap dimension s will decrease $Z_{coupled\ wire}$.

The next step (FIG. 13C) in the analysis of the impedance between coupled signal wires is performed with the addition to the simulation of a model of a transmission line having parameters $Z_{coupled\ wire}$ and τ. Transmission line 1370 connects between the coupled wires 1340 and 1350 as shown in FIG. 13C. This scheme assumes transverse electromagnetic (TEM) propagation, a condition that is met only when the coupled signal wires are "close" relative to their distance above or below a reference plane. If $d_1$ is the distance from the bottom surface 1351 of the wire 1350 to the upper surface 1346 of the reference plane 1345, then this scheme should give sufficiently accurate simulation results to the limit of $s=3d_1$, beyond which coupling is generally considered negligible.

In an exemplary model, with the following values:

s=30 μm, h=12 μm, $\epsilon_r$=4, and l=4 mm

Then $Z_{coupled\ wire}$=472 [ohms] and

τ=26.8 [ps]

If the signal wires have a characteristic impedance of 50 ohms, then the saturated coupling between them is 50/472=10.6%.

If fringe capacitance is found to increase $C_{plate}$ by, for example, a factor of 2, then s may be decreased by the same factor. Thus, the effective $Z_{coupled\ wire}$=236 ohms for this example.

The foregoing description of the present invention has been presented for purposes of illustration and description. It is not intended to be exhaustive or to limit the invention to the precise form disclosed or to the materials in which the form may be embodied, and many modifications and variations are possible in light of the above teaching. Such modifications and variations that may be apparent to a person skilled in the art are intended to be included within the scope of this invention as defined by the accompanying claims.

What is claimed is:

1. A method of power supply noise and signal coupling analysis for creating a frequency-dependent electrical model related to a microelectronic package, said method comprising the steps of:

extracting geometries from said microelectronic package;

partitioning said geometries into a plurality of cells, said cells having a characteristic size in each dimension of said geometries, wherein said characteristic size is derived from a fastest signal rise time of a signal adapted to propagate within the microelectronic package;

determining a first equivalent circuit for each of said cells;

for each pair of adjacent cells consisting of a first cell and a second cell, determining a second equivalent circuit for a conduction current between the first cell and the second cell and for an electromagnetic coupling between the first cell and the second cell; and outputting a description of said first and second equivalent circuits configured for use in an electrical circuit simulator.

2. The method of claim 1, wherein said cells comprise a rectangular shape having a width and a length, wherein said width and length each do not exceed ¹⁄₂₀ in size of the wavelength of a knee frequency of the signal.

3. The method of claim 1, wherein said step of determining a first equivalent circuit includes the step of assigning a value of resistance, inductance and capacitance of each resistor, inductor, and capacitor, respectively, in said first equivalent circuit.

4. The method of claim 1, wherein determining a second equivalent circuit comprises modeling at least one electrical interaction between said first cell and said second cell of said pair of adjacent cells, said at least one electrical interaction being selected from the group consisting of a conduction current interaction, an electric field interaction, a magnetic field interaction, and combinations thereof.

5. The method of claim 1, wherein said first equivalent circuit of said cell includes at least one functional components located within said cell, said at least one functional component being selected from the group consisting of a signal via, a power supply via, a signal wire, a conductive plane, and combinations thereof.

6. The method of claim 1, wherein said first equivalent circuit of said cell is configured to represent at least one transmission line model having at least one functional component within said cell, said at least one functional component being selected from the group consisting of a signal via, a power supply via, a signal wire, a conductive plane, and combinations thereof.

7. The method of claim 1, wherein said first equivalent circuit of said cell is configured to represent at least one inductive coupling model having at least one functional component within said cell, said at least one functional component being selected from the group consisting of a signal via, a power supply via, a signal wire, a conductive plane, and combinations thereof.

8. The method of claim 1, wherein said first equivalent circuit of said cell is configured to represent at least one capacitive coupling model having at least one functional component within said cell, said at least one functional component being selected from the group consisting of a signal via, a power supply via, a signal wire, a conductive plane, and combinations thereof.

9. The method of claim 1, wherein said first equivalent circuit of said cell is configured to represent at least one resistive model having at least one functional component within said cell, said at least one functional component being selected from the group consisting of a signal via, a power supply via, a signal wire, a conductive plane, and combinations thereof.

10. The method of claim 1, wherein determining a first equivalent circuit of said cell comprises modeling at least one electrical interaction within said cell, said at least one electrical interaction being selected from the group consisting of a conduction current interaction, an electric field interaction, a magnetic field interaction, and combinations thereof.

11. A method of power supply noise and signal coupling analysis of the electrical interactions between functional components of an electrical system, said electrical system formed in a medium, said method comprising:

categorizing said functional components into at least one functional category;

extracting geometries from said electrical system based on said functional category;

dividing said electrical system into a plurality of cells, wherein each cell has at least one directly neighboring cell, wherein each cell has a length and a width dimension, said length and width dimension generally being equal to the maximum length and width defined by a fraction of the wavelength corresponding to a knee frequency of a signal;

determining whether functional components are present within given ones of said cells;

modeling electrical interactions between functional components within said given cells;

determining which functional components are located in directly neighboring cells;

modeling electrical interactions between functional components located in directly neighboring cells;

calculating equivalent circuits related to the electrical interactions between said functional components within said cells and between directly neighboring cells; and outputting said equivalent circuits in a format usable by an electrical circuit simulator.

12. The method according to claim 11, wherein said fraction of the wavelength corresponding to the knee frequency is one-twentieth.

13. The method according to claim 11, wherein said functional categories include at least one category selected from the group consisting of power vias, signal wires, and power planes.

14. The method according to claim 11, wherein the step of modeling electrical interactions between functional components within a given cell further comprises:

determining an equivalent circuit composed of lumped elements for the functional components within each of said cells, said equivalent circuit configured to model electromagnetic coupling between functional components located within said cells, wherein said functional components include signal vias, power supply vias, signal wires, and conductive planes.

15. The method according to claim 11, wherein the step of modeling electrical interactions between functional components within a given cell further comprises:

determining an equivalent circuit composed of at least one transmission line model, said equivalent circuit configured to model electromagnetic coupling between functional components located within said cells, wherein said functional components include signal vias, power supply vias, signal wires, and conductive planes.

16. The method according to claim 11, wherein the step of modeling electrical interactions between functional components located in directly neighboring cells further comprises:

determining an equivalent circuit composed of lumped elements for the functional components within each of said cells, said equivalent circuit configured to model electromagnetic coupling between functional components located within said cells, wherein said functional components include signal vias, power supply vias, signal wires, and conductive planes.

17. The method according to claim 11, wherein the step of modeling electrical interactions between functional components located in directly neighboring cells further comprises:

determining an equivalent circuit composed of at least one transmission line model, said equivalent circuit configured to model electromagnetic coupling between functional components located within said cells, wherein said functional components include signal vias, power supply vias, signal wires, and conductive planes.

18. An electrical circuit signal coupling analysis system for modeling the electrical interactions between functional components of a microelectronic package, said analysis system comprising:

an electrical system formed in said microelectronic package, said electrical system including a plurality of functional components, wherein said functional components are one of signal vias, power supply vias, signal wires, and conductive planes;

an overall model of the electrical system, wherein said overall model is a representation of the electrical system as a plurality of cells having uniform length and width and height dimensions, said length and width dimensions being substantially equal to one another and are dependent on a fraction of the fastest signal rise time of a signal, said height dimension being dependent on power plane separation in the package, and wherein each cell has at least one directly neighboring cell which is a direct neighbor, wherein directly neighboring cells share a common face therebetween;

a plurality of intra-cell models, each intra-cell model representing the electrical interactions between functional components which are located within a particular cell;

a plurality of inter-cell models, each inter-cell model representing the electrical interactions between functional components which are located within directly neighboring cells; and extraction means for deriving data corresponding to the electrical interactions which result from the intra-cell models and the inter-cell models.

19. The signal coupling analysis system of claim 18, wherein said intra-cell models, and said inter-cell models, each utilize an equivalent circuit composed of lumped elements to model the electromagnetic coupling between functional components which are located within said cells.

20. The signal coupling analysis system of claim 18, wherein said intra-cell models and said inter-cell models utilize an equivalent circuit composed of a transmission line model for the electromagnetic coupling between functional components within each of said cells.

21. The signal coupling analysis system of claim 18, wherein said length and width dimension each do not exceed $\frac{1}{20}$ in size of the wavelength of a knee frequency of the signal.

22. A method of extracting a model, the method comprising:

determining a first dimension whose maximum value is a fraction of the wavelength of a knee frequency of a signal;

subdividing a circuit into equivalent circuit subdivisions, wherein each circuit subdivision has a length and a width dimension equal to or less than said first dimension; and outputting a description of said equivalent circuit subdivisions to create said model for use in an electrical circuit simulator.

23. The method according to claim 22, wherein said fraction is one-twentieth.

24. The method according to claim 22, wherein said equivalent circuit subdivisions comprise lumped element circuits.

25. The method according to claim 24, further comprising the step of modeling electrical interactions between equivalent circuits within a given circuit subdivision, wherein said equivalent circuit models electromagnetic coupling between functional components located within said circuit subdivision, and wherein said functional components include signal vias, power supply vias, signal wires, and conductive planes.

26. The method according to claim 24, further comprising the step of modeling electrical interactions between equivalent circuits within directly neighboring circuit subdivisions, wherein said equivalent circuit models electromagnetic coupling between functional components located within said circuit subdivision, and wherein said functional components include signal vias, power supply vias, signal wires, and conductive planes.

27. The method according to claim 22, wherein said equivalent circuit subdivisions comprise transmission line circuits.

28. The method according to claim 27, further comprising the step of modeling electrical interactions between equivalent circuits within a given circuit subdivision, wherein said equivalent circuit models electromagnetic coupling between functional components located within said circuit subdivision, and wherein said functional components include signal vias, power supply vias, signal wires, and conductive planes.

29. The method according to claim 27, further comprising the step of modeling electrical interactions between equivalent circuits within directly neighboring circuit subdivisions, further comprising the step of modeling electrical interactions between equivalent circuits within a given circuit subdivision, wherein said equivalent circuit models electromagnetic coupling between functional components located within said circuit subdivision, and wherein said functional components include signal vias, power supply vias, signal wires, and conductive planes.

30. The method according to claim 22, wherein the step of combining outputting said description further comprises the step of assuming that only directly neighboring circuit subdivisions interact.

* * * * *